US012779603B2

(12) United States Patent
Miyahara et al.

(10) Patent No.: US 12,779,603 B2
(45) Date of Patent: Nov. 3, 2026

(54) BAR FEEDER AND MACHINE TOOL

(71) Applicant: DMG MORI CO., LTD., Nara (JP)

(72) Inventors: Katsuhito Miyahara, Nara (JP); Kento Hiei, Nara (JP)

(73) Assignee: DMG MORI CO., LTD., Nara (JP)

( * ) Notice: Subject to any disclaimer, the term of this patent is extended or adjusted under 35 U.S.C. 154(b) by 422 days.

(21) Appl. No.: 18/554,955

(22) PCT Filed: Apr. 30, 2021

(86) PCT No.: PCT/JP2021/017258
§ 371 (c)(1),
(2) Date: Oct. 11, 2023

(87) PCT Pub. No.: WO2022/230197
PCT Pub. Date: Nov. 3, 2022

(65) Prior Publication Data
US 2024/0116149 A1 Apr. 11, 2024

(51) Int. Cl.
*B23Q 11/08* (2006.01)
*B23Q 5/22* (2006.01)
(Continued)

(52) U.S. Cl.
CPC ............... *B23Q 5/22* (2013.01); *B23Q 7/001* (2013.01); *B23Q 7/046* (2013.01);
(Continued)

(58) Field of Classification Search
CPC . B23Q 5/38; B23Q 5/402; B23Q 5/42; B23Q 7/001; B23Q 7/042; B23Q 7/046; B23Q 7/06; B23Q 7/18; B23Q 11/0891
See application file for complete search history.

(56) References Cited

U.S. PATENT DOCUMENTS 5,108,245 A * 4/1992 Palmer ..................... B23Q 7/04
414/745.9
6,189,424 B1 * 2/2001 Wheeling ............ B23Q 11/005
82/127
(Continued)

FOREIGN PATENT DOCUMENTS

DE 3420531 A1 12/1985
DE 102011082839 A1 3/2013
(Continued)

OTHER PUBLICATIONS

International Search Report and Written Opinion, PCT/JP2021/017258, dated Jul. 27, 2021, 8 pages.
(Continued)

*Primary Examiner* — Jermie E Cozart
(74) *Attorney, Agent, or Firm* — Stinson LLP

(57) ABSTRACT

Provided is a bar feeder that pushes a rod-shaped workpiece into a hollow main shaft having a holding mechanism at one end of the main shaft, from another end, the bar feeder being arranged in a work room arranged adjacent to a processing room where the main shaft is installed, the work room being provided with a work machine including a transport mechanism for moving an article to and from the processing room, and the bar feeder being arranged at a position at which at least a portion thereof overlaps with the work mechanism in a top view or a front view.

6 Claims, 6 Drawing Sheets

(51) Int. Cl.

| | |
|---|---|
| ***B23Q 7/00*** | (2006.01) |
| ***B23Q 7/04*** | (2006.01) |
| *B23Q 5/38* | (2006.01) |
| *B23Q 5/40* | (2006.01) |
| *B23Q 5/42* | (2006.01) |
| *B23Q 7/06* | (2006.01) |
| *B23Q 7/18* | (2006.01) |

(52) U.S. Cl.

CPC ............ *B23Q 11/0891* (2013.01); *B23Q 5/38* (2013.01); *B23Q 5/402* (2013.01); *B23Q 5/42* (2013.01); *B23Q 7/042* (2013.01); *B23Q 7/06* (2013.01); *B23Q 7/18* (2013.01)

(56) References Cited

U.S. PATENT DOCUMENTS

| | | | | |
|---|---|---|---|---|
| 6,199,461 | B1 | 3/2001 | Geiser | |
| 2003/0026671 | A1* | 2/2003 | Green ................ | B23Q 11/0891 409/134 |
| 2008/0271304 | A1 | 11/2008 | Grossmann | |
| 2009/0064830 | A1 | 3/2009 | Geiser | |
| 2012/0186407 | A1 | 7/2012 | Nakaya et al. | |
| 2015/0258649 | A1 | 9/2015 | Nakazawa et al. | |
| 2016/0214805 | A1* | 7/2016 | Ebihara ................ | B23Q 11/148 |
| 2020/0147738 | A1 | 5/2020 | Tanio | |

FOREIGN PATENT DOCUMENTS

| | | | |
|---|---|---|---|
| EP | 0900612 | A1 | 10/1999 |
| EP | 2033725 | A1 | 11/2009 |
| EP | 2913146 | A1 | 2/2015 |
| JP | S54-26579 | A | 2/1979 |
| JP | H11-156602 | A | 6/1999 |
| JP | 2011-73117 | A | 4/2011 |
| JP | 2020-78847 | A | 5/2020 |
| JP | 2021-53713 | A | 4/2021 |

OTHER PUBLICATIONS

Extended European Search Report, European Patent Application No. 21939353.5, Jan. 24, 2025, 8 pages.

* cited by examiner

BAR FEEDER AND MACHINE TOOL

REFERENCE TO RELATED APPLICATIONS

This application is the 371 U.S. national stage application of International Patent Application No. PCT/JP2021/017258, filed Apr. 30, 2021, the entire disclosure of which is incorporated herein by reference.

TECHNICAL FIELD

The present invention relates to a bar feeder and a machine tool, and particularly to a bar feeder and a machine tool suitable for NC machine tools (Numerically Controlled Machine Tools) such as multitasking machines and lathes.

BACKGROUND ART

PTL 1 proposes a material supply device that includes a material pushing means for pushing a material from a rear end into a hollow main shaft having a chuck at a front end, and a material supplying means for individually feeding the material to the material pushing means, in which the material supplied by the material supplying means is supplied by being pushed into the main shaft by the material pushing means.

More specifically, the material supply device is configured such that a holding means for holding the material is provided at a leading end of the material pushing means, the material supplying means has a material moving means for moving the material so as to be held by the holding means, and the material is supplied to the main shaft while being held by the holding means.

CITATION LIST

Patent Literature

PTL 1: Japanese Laid-Open Patent Publication No. 2011-73117

SUMMARY OF INVENTION

Technical Problem

When such a material supply device (hereinafter referred to as a "bar feeder") is used, it becomes possible to automatically supply even long rod-shaped workpieces to machine tools, and machining efficiency can be improved dramatically.

However, since the conventional bar feeder was configured as a single device to be installed on a lateral side of a machine tool in order to push the material from the rear end into the hollow main shaft arranged in the machine tool, when the bar feeder is installed on the lateral side of the machine tool, the space near the installation space of the bar feeder cannot be used, and thus improvement has been desired from the viewpoint of improving the usage efficiency of the installation space.

It is an object of the present invention to provide a bar feeder and a machine tool capable of increasing usage efficiency of a space in the surrounding area of a machine tool and achieving multifunctionality in a limited space.

Solution to Problem

In order to achieve this object, a characteristic configuration of the bar feeder according to the present invention is a bar feeder configured to push a rod-shaped workpiece into a hollow main shaft having a holding mechanism at one end, from another end, the bar feeder being arranged in a work room that is arranged adjacent to a processing room where the main shaft is installed, the work room being provided with a work mechanism including a transport mechanism configured to move an article to and from the processing room, and the bar feeder being arranged at a position where at least a portion thereof overlaps with the work mechanism in a top view or a front view.

Also, a characteristic configuration of a machine tool according to the present invention includes: a processing room where a hollow main shaft for holding a workpiece using a holding mechanism provided at one end of the main shaft is installed; and a work room arranged adjacent to the processing room, in which the work room includes a work mechanism including a transport mechanism for moving an article to and from the processing room, and the bar feeder having the above-described characteristic configuration, arranged at a position at which at least a portion thereof overlaps with the work mechanism in a top view or a front view.

Advantageous Effects of Invention

According to the present invention, it is possible to provide a bar feeder and a machine tool that can increase the usage efficiency of a space in the surrounding area of a machine tool and achieve multifunctionality in a limited space.

DESCRIPTION OF EMBODIMENTS

Basic Embodiments

Figure 1:
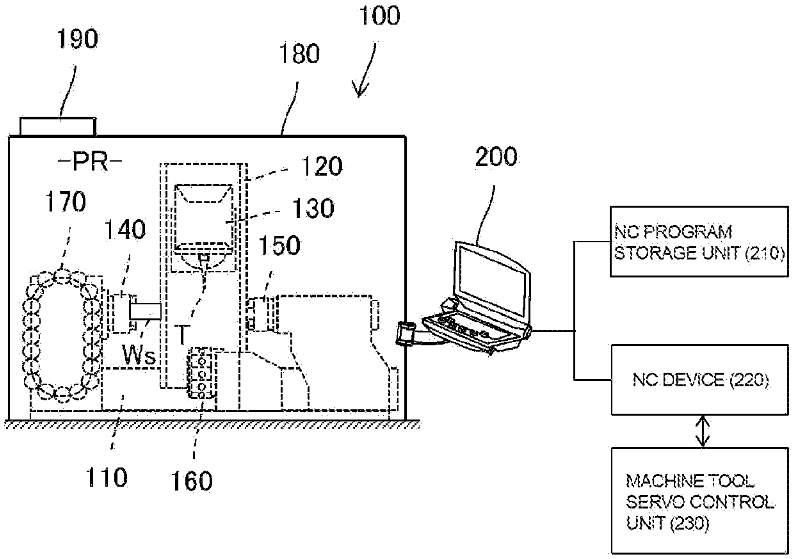
FIG. 1 is an explanatory diagram of a multitasking machine, which is an example of a machine tool.

Basic embodiments of the bar feeder and machine tool according to the invention are described below.

A first characteristic configuration of the bar feeder is a bar feeder configured to push a rod-shaped workpiece into a hollow main shaft having a holding mechanism at one end, from another end, the bar feeder being arranged in a work room that is arranged adjacent to a processing room where the main shaft is installed, the work room being provided with a work mechanism including a transport mechanism configured to move an article to and from the processing room, and the bar feeder being arranged at a position where at least a portion thereof overlaps with the work mechanism in a top view or a front view.

The transport mechanism, which is a work mechanism provided in the work room, transports articles needed for processing, such as unprocessed workpieces placed on a table in the work room, and tools and measuring instruments required for processing, to the processing room, and transports processed workpieces, used tools and measuring instruments, and the like from the processing room to the table in the work room. By arranging the bar feeder at a position where at least a portion thereof overlaps with the work mechanism in a top view or a front view in the space of such a work room, the work room can be effectively used as an installation space for the bar feeder.

A second characteristic configuration includes, in addition to the first characteristic configuration described above, a workpiece stocker capable of accommodating a plurality of the rod-shaped workpieces; a workpiece support configured to support the rod-shaped workpiece so as to be movable toward the main shaft; a work feeder configured to retrieve the rod-shaped workpiece from the workpiece stocker and guide the retrieved rod-shaped workpiece to the workpiece support; and a workpiece pushing mechanism configured to push the rod-shaped workpiece supported by the workpiece support into the main shaft.

The workpiece stocker, the workpiece support, the workpiece feeder, and the workpiece pushing mechanism are arranged in a spatial region that does not interfere with the work mechanism arranged in the work room. Each of the plurality of rod-shaped workpieces accommodated in the workpiece stocker is guided by the workpiece feeder and received by the workpiece support, and is pushed toward the main shaft of the machine tool by the workpiece pushing mechanism while supported on the workpiece support.

In a third characteristic configuration, in addition to the first or second characteristic configuration described above, the processing room is a processing room of a multitasking machine including a first main shaft for holding a workpiece, a second main shaft arranged so as to oppose the first main shaft, and a tool main shaft for processing the workpiece, and the rod-shaped workpiece is pushed into the second main shaft.

If the machine tool is a multitasking machine, the space adjacent to the second main shaft side has a higher degree of freedom for using space than the space adjacent to the first main shaft side where a large work mechanism such as a tool magazine is arranged. In view of this, by using a hollow main shaft as the second main shaft, the bar feeder can be installed in a state in which it fits well overall and the space usage efficiency is high.

A first characteristic configuration of a machine tool according to the present invention is a machine tool including: a processing room where a hollow main shaft for holding a workpiece using a holding mechanism provided at one end of the main shaft is installed; and a work room arranged adjacent to the processing room, in which the work room includes a work mechanism including a transport mechanism for moving an article to and from the processing room, and the bar feeder having the above-described first or second characteristic configuration, arranged at a position at which at least a portion thereof overlaps with the work mechanism in a top view or a front view.

By installing a work mechanism including a transport mechanism in a work room adjacent to a processing room of the machine tool, and installing a bar feeder at a position where at least a portion thereof overlaps with the work mechanism in a top view or a front view, it is possible to realize a machine tool with high space usage efficiency.

In a second characteristic configuration of a machine tool according to the present invention, in addition to the first characteristic configuration described above, a shutter for allowing communication and shutting off communication between the processing room and the work room is provided on a pushing path of the rod-shaped workpiece pushed by the bar feeder.

By closing the shutter after pushing the rod-shaped workpiece into the processing room, it is possible to prevent coolant mist and cutting debris scattered during a workpiece processing step from entering the work room.

Specific Embodiment

Specific embodiments of the bar feeder and the machine tool according to the present invention are described below.

FIG. 1 illustrates a basic structure of a machine tool to which the present invention is applied.

The machine tool 100 is constituted by a five-axis multitasking machine including a tool main shaft 130 that can move in up-down and left-right directions on the page surface of the drawings, along a column 120 installed on a bed 110, a first main shaft 140 that holds a workpiece Ws, a second main shaft 150 that is arranged opposite to the first main shaft 140 and can move in the left-right direction, a second tool rest 160 that is arranged so as to oppose the tool main shaft 130 between the first main shaft 140 and the second main shaft 150 and can move in the up-down and left-right directions, and a cover body 180 that covers the machining space formed by these portions. That is, an inner space partitioned by the cover body 180 is a processing room PR.

A tool magazine 170 is provided in front of the frame of the first main shaft 140, and a tool T is attached to the tool main shaft 130. The tool T is selected from a plurality of tools T accommodated in the tool magazine 170 and is attached via an automatic tool exchange device (not shown).

An operation panel 200 is installed outside the cover body 180, and an NC program storage unit 210, an NC device 220, and the like are connected to the operation panel 200 via a communication cable. A machine tool servo control unit 230 for servo-driving the tool main shaft 130, the first main shaft 140, the second main shaft 150, the second tool rest 160, and the like of the machine tool 100 is connected to the NC device 220.

Coolant nozzles are arranged near the tool main shaft 130 and the second tool rest 160, and when machining the workpiece Ws, which is a material to be processed, coolant is sprayed toward the processing position of the workpiece Ws held by the first main shaft 140 or the second main shaft 150. A mist collector 190 for collecting the mist-like coolant that is generated at that time and drifts in the processing space together with the air is arranged on the upper surface of the cover body 180. Note that a door that can be opened and closed is provided in the front surface of the cover body 180, although this is not shown in FIG. 1.

The machine tool servo controller 230 is driven due to an NC program being executed by the NC device 220. The machine tool servo control unit 230 controls the tool main shaft 130 to move in the up-down and left-right directions, controls the second main shaft 150 to move in the left-right direction, and controls the second tool rest 160 to move in the up-down and left-right directions. Also, the machine tool servo control unit 230 controls the tool T held by the tool main shaft 130, the tool held by the second tool rest 160, the first main shaft 140, and the second main shaft 150 so as to rotate.

A chip-shaped workpiece Ws or a later-described rod-shaped workpiece Wr held by a holding mechanism provided at the leading end of the first main shaft 140 is subjected to cutting work performed by the tool T held by the tool main shaft 130 or a tool held by the second tool rest 160, and then the workpiece Ws or Wr received and held by the holding mechanism provided at the leading end of the second main shaft 150 is subjected to cutting work performed by the tool held by the tool main shaft 130 or the tool held by the second tool rest 160. A known chuck mechanism or the like is used as the holding mechanism. The workpiece Ws or Wr is subjected to cutting work performed by the tool held by the tool main shaft 130 or the tool held by the second tool rest 160 while held by both the first main shaft 140 and the second main shaft 150 in some cases.

The second main shaft 150 is hollow, and a rod-shaped workpiece Wr with a circular cross section (hereinafter referred to as a "rod-shaped workpiece Wr" to avoid confusion with the chip-shaped workpiece Ws) can be inserted leftward from the right end of the second main shaft 150.

Figure 2:
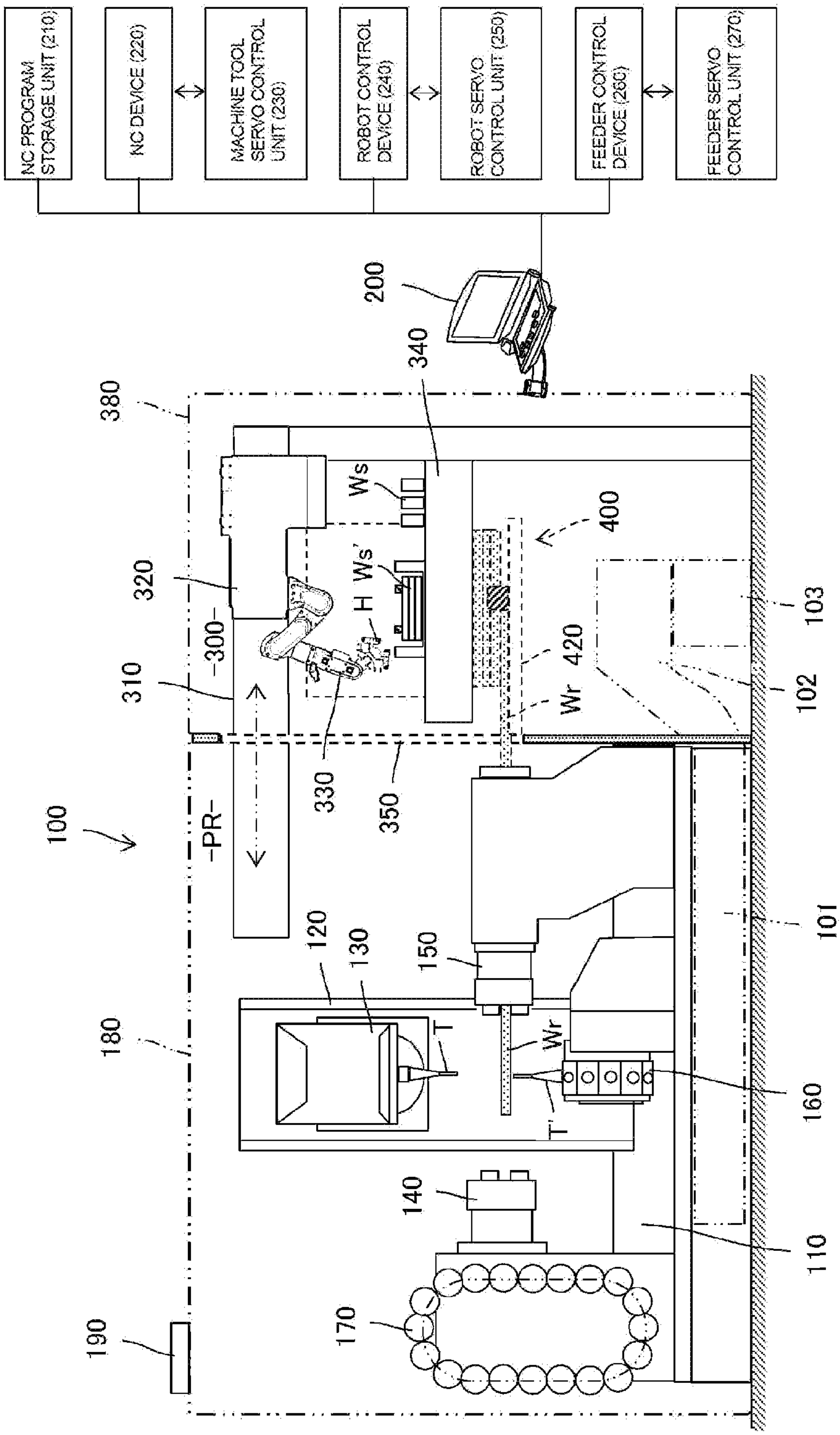
FIG. 2 is an explanatory diagram showing a state in which a bar feeder is included in a work room installed adjacent to a machine tool.

FIG. 2 shows a state in which a work room 300 provided with a work mechanism including a transport mechanism for moving articles to and from the processing room PR is installed adjacent to the right side of the machine tool 100. The cover body 380 is installed in the surrounding area of the work room 300 for safety management.

The work room 300 is provided with a workpiece placement table 340 that accommodates unprocessed chip-shaped workpieces Ws and a processed workpiece Ws'. An articulated robot 330 having a hand H for gripping a workpiece Ws attached to its leading end is provided in the upper space of the workpiece placement table 340, and a support 320 of the articulated robot 330 is attached so as to be movable in a horizontal direction as indicated by an arrow, along a horizontal guide plate 310. The articulated robot 330 functions as a transport mechanism that moves articles to and from the processing room PR, and the workpiece placement table 340 and the articulated robot 330 function as work mechanisms.

A shutter 350 for partitioning the processing space is provided on opposing wall portions of the cover body 180 of the machine tool 100 and the cover body 380 of the work room 300, the shutter 350 is opened when the articulated robot 330 automatically carries the chip-shaped workpiece Ws placed on the workpiece placement table 340 into the machine tool 100 and automatically carries the processed workpiece Ws' out from the machine tool 100 to the workpiece placement table 340, and the shutter 350 is closed when the workpiece Ws is processed by the machine tool 100. Note that, needless to say, the articulated robot 330 can be used when carrying the processed rod-shaped workpiece Wr out from the machine tool 100 to the workpiece placement table 340.

A coolant recovery tank 101 for recovering coolant that drips into the processing room PR is installed below the bed 110, and is configured such that cutting debris generated during machining is recovered in the coolant recovery tank 101 together with the coolant. A chip conveyor 102 is arranged at the bottom of the coolant recovery tank 101, and cutting debris recovered in the coolant recovery tank 101 are carried out of the machine by the chip conveyor 102 and recovered in a recovery container 103. The discharge side end of the chip conveyor 102 and the recovery container 103 are arranged in the lower space of the work room 300.

In the work room 300, a bar feeder 400 is arranged at a position where at least a portion thereof overlaps with the work mechanism in a top view or a front view.

Figure 3:
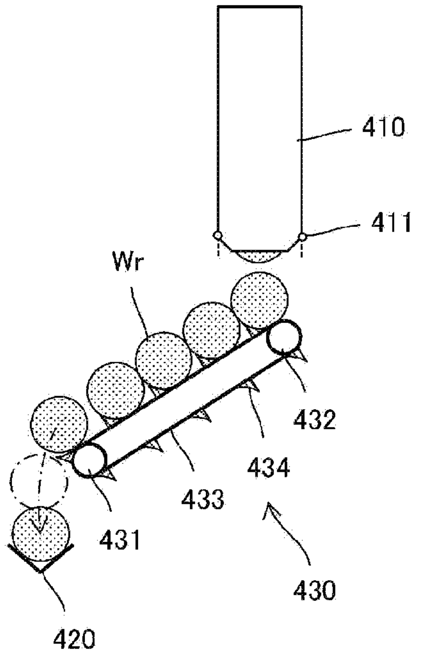
FIG. 3 is an explanatory diagram showing a side view of a workpiece stocker, a workpiece support, and a workpiece feeder, which are main parts of the bar feeder.
Figure 4:
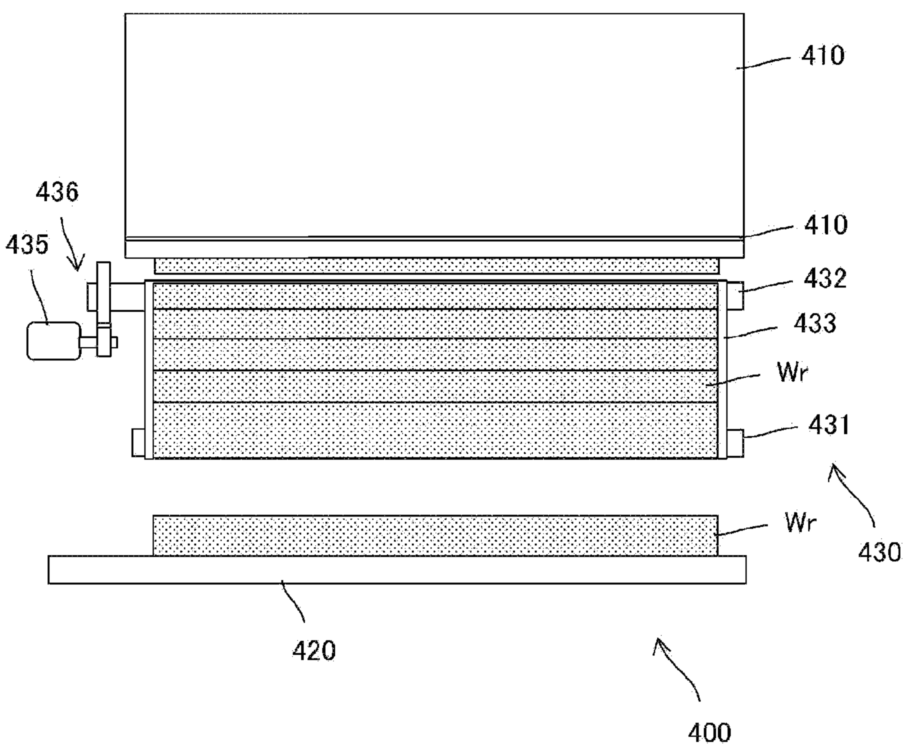
FIG. 4 is an explanatory diagram showing a front view of a workpiece stocker, a workpiece support, and a workpiece feeder, which are main parts of the bar feeder.
Figure 5:
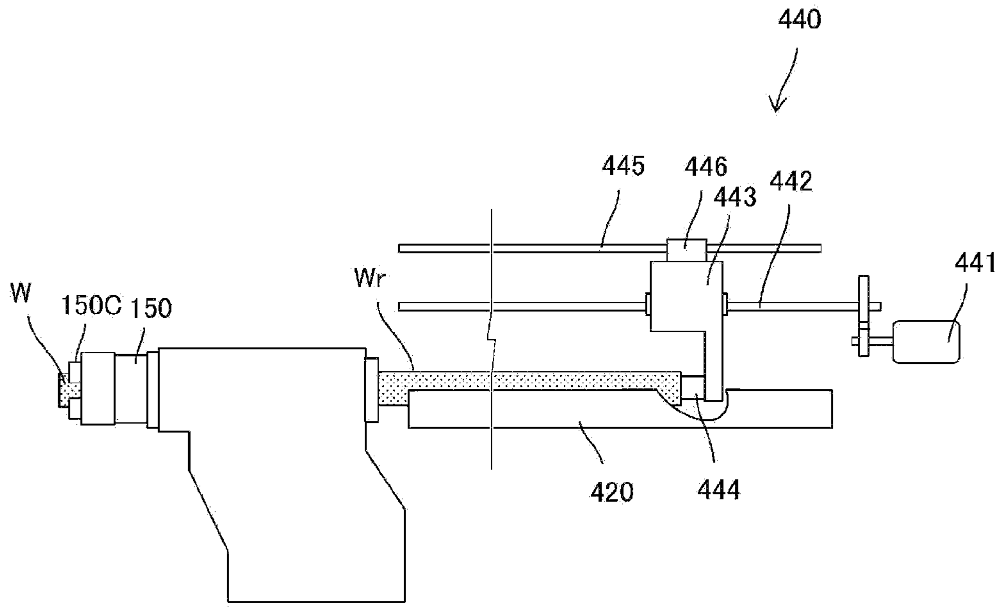
FIG. 5 is an explanatory diagram showing a front view in which part of a workpiece pushing mechanism, which is a main part of the bar feeder, has been cut away.

FIGS. 3 to 5 show details of the main parts of the bar feeder 400. The bar feeder 400 includes a workpiece stocker 410 capable of accommodating a plurality of rod-shaped workpieces Wr, a workpiece support 420 supporting the rod-shaped workpiece Wr so as to be movable toward the second main shaft 150, a workpiece feeder 430 for retrieving the rod-shaped workpieces Wr from the workpiece stocker 410 and guiding the retrieved rod-shaped workpieces Wr to the workpiece support 420, and a workpiece pushing mechanism 440 for pushing the rod-shaped workpieces Wr supported by the workpiece support 420 into the hollow portion of the second main shaft 150.

As shown in FIGS. 3 and 4, the workpiece stocker 410 has an opening formed at its upper end and is formed in a substantially cuboid shape with an opening/closing mechanism 411 at its lower end, and a plurality of rod-shaped workpieces Wr with circular cross-sections are accommodated therein in the up-down direction in a horizontal orientation. The opening/closing mechanism 411 is constituted by a pair of doors with hinges, and is configured such that it can be controlled to open and close by an electromagnetic solenoid. In a posture in which the doors are closed by the opening/closing mechanism, the rod-shaped workpieces Wr are introduced from the opening at the upper end, and a predetermined number of rod-shaped workpieces Wr are accommodated therein.

The workpieces Wr accommodated in the workpiece stocker 410 are supplied by being dropped onto the workpiece feeder 430 arranged below the workpiece stocker 410 by releasing the opening/closing mechanism 411, and the workpieces Wr are sent to the workpiece support 420 via the workpiece feeder 430.

The workpiece feeder 430 includes an endless belt 433 wound between a pair of support shafts 431 and 432. Claws 434 for receiving the rod-shaped workpiece Wr are attached to the endless belt 433 at predetermined intervals. A speed-reduction gear mechanism 436 is attached to one end of an upper support shaft 432, and the motive power of a motor 435, which is a driving mechanism, is transmitted to the support shaft 432 via the speed-reduction gear mechanism 436.

A transport surface of the endless belt 433 is inclined by a predetermined angle with respect to the horizon, and the plurality of rod-shaped workpieces Wr supplied by being dropped from the workpiece stocker 410 are sequentially transported to the workpiece support 420 provided below while being received by the claws 434.

The rod-shaped workpieces Wr transported to the upper part of the workpiece support 420 via the workpiece feeder 430 are supplied by being dropped onto to the workpiece support 420 while maintaining a horizontal orientation. The workpiece support 420 is a horizontally-oriented guide member having a groove with a V-shaped cross section, and the leading end side thereof is arranged toward the hollow portion of the second main shaft 150.

As shown in FIG. 5, the rod-shaped workpiece Wr supported by the workpiece support 420 is pushed into the hollow portion of the second main shaft 150 by the workpiece pushing mechanism 440 on the rear end side. The workpiece pushing mechanism 440 includes a ball screw 442 drivingly coupled to a motor 441, which is a driving mechanism, via a principle mechanism, and a pusher body 443 screwed onto the ball screw 442.

A pressing arm 444 for pressing the end portion of the rod-shaped workpiece Wr is formed extending at a lower portion of the pusher body 443, and a bearing member 446 for sliding on the guide shaft 445 is provided above the pusher body 443. As the ball screw 442 rotates in the forward direction, the pusher body 443 moves linearly while maintaining the orientation of the pressing arm 444, and accompanying this, the pressing arm 444 pushes and transports the rod-shaped workpiece Wr toward the second main shaft 150. Note that both ends of the ball screw 442 and the guide shaft 445 are positioned and fixed at desired positions via fixing members.

When the rod-shaped workpiece Wr is pushed into the hollow portion of the second main shaft 150 and held by the holding portion 150 of the second main shaft 150, the pusher body 443 returns to a standby position at which it was arranged before pushing the rod-shaped workpiece Wr, accompanying reverse rotation of the ball screw 442. Note that the holding portion 150 has three claws arranged at intervals of 120° around the axis of the second main shaft 150 so as to be movable along the radial direction, and when the claws are moved to a wide diameter side, the rod-shaped workpiece Wr, which is the gripped object, is released, and when the claws are moved to a reduced diameter side, the rod-shaped workpiece Wr, which is the gripped object, is fixed.

For example, when the rod-shaped workpiece Wr is fixed to the second main shaft 150, the second main shaft 150 advances toward the first main shaft 140 and the shutter 350 is closed. The leading end of the rod-shaped workpiece Wr is held by the holding portion of the first main shaft 140, and after the holding portion of the second main shaft 150 is released, the second main shaft 150 moves backward, and thereafter, the processing work is started by a tool included on the tool main shaft 130 or the second tool rest 160. When the desired processing is completed, the processed portion is cut off from the rod-shaped workpiece Wr and carried out to the workpiece placement table 340 by the hand of the articulated robot 330.

Figure 6:
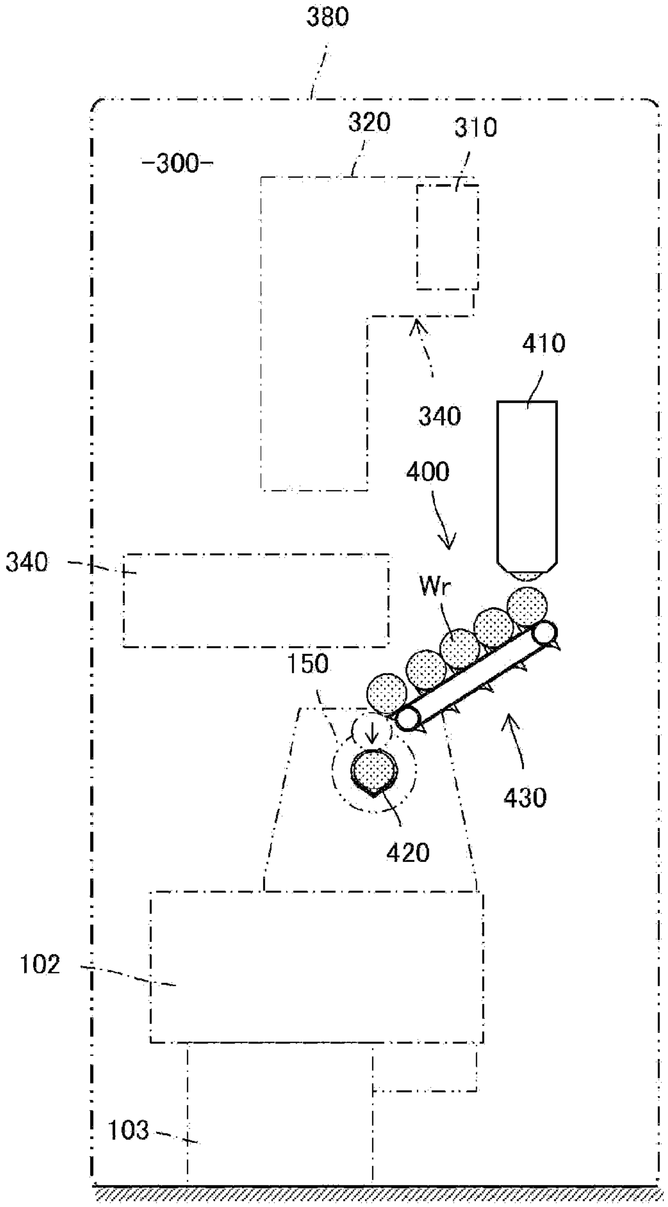
FIG. 6 is an explanatory diagram of a side view showing an arrangement relationship between a work mechanism and a bar feeder installed in a work room.

As shown in FIG. 6, the bar feeder 400 installed in the work room 300 is arranged at a position where at least a portion thereof overlaps with a work mechanism such as the workpiece placement table 340 and the articulated robot 330 in a top view or a front view. It is possible to realize a machine tool with high space usage efficiency by installing the bar feeder 400 in a space that does not physically interfere with the work mechanism including the transport mechanism installed in the work room 300 adjacent to the processing room PR of the machine tool 100.

Returning to FIG. 2, the control configuration for the bar feeder 400, the articulated robot 330, and the like installed in the work room 300 will be described. In addition to the above-described NC program storage unit 210, NC device 220, and machine tool servo control unit 230, the operation panel 200 includes a robot control device 240 for controlling the articulated robot 330, a robot servo control unit 250, a feeder control device 260 that performs control such that the bar feeder 400 operates with above-described procedure, and a feeder servo control unit 270.

The opening and closing of the shutter 350 and the operation of the articulated robot 330 are driven by the robot servo control unit 250, which is servo-controlled by the robot control unit 230 that executes an NC program stored in the NC program storage unit 210. Moreover, the operation of the bar feeder 400 is driven by the feeder servo control unit 250, which is servo-controlled by the feeder control unit 260 executing NC programs stored in the NC program storage 210.

In the above-described embodiment, an example in which the work room 300 is coupled to the right side portion of the processing space has been described, but the coupling position of the work room 300 is not limited to this mode. For example, the work room 300 may also be connected to the left side portion of the cover body 180, and the work feeder 430 described above may be installed in the work room. In this case, the first main shaft 140 is a hollow main shaft having a holding mechanism at one end.

In the above-described embodiment, an example in which the workpiece pushing mechanism 440 is constituted by a dedicated pusher has been described. However, the rod-shaped workpiece W may also be pushed in using the articulated robot 330 instead of the pusher, and the rod-shaped workpiece W may be gripped by a hand of the articulated robot 330 and pushed into the hollow main shaft.

The workpiece placement table 340 and the articulated robot 330 installed in the work room 300 described above and the main parts constituting each mechanism of the bar feeder 400 are attached to a common support frame that constitutes the work room. However, individual support frames may also be provided if space permits.

As the work room 300, it goes without saying that in addition to an automatic workpiece transport station including a transport mechanism such as an articulated robot, a setup station including a work mechanism for preparing workpieces, jigs, and the like required for processing to a required state, a post-processing station or a deburring station including a work mechanism for post-processing for removing cutting debris attached to the processed workpiece and removing burrs, a measuring station including measuring equipment, and the like can also be used as the installation space for the bar feeder 400.

In the above-described embodiment, an example of using a five-axis multitasking machine as the machine tool 100 has been described. However, a machine tool to which the present invention is applicable can also be another machine tool 100 such as a lathe, in addition to a five-axis multitasking machine.

Although embodiments and modes of implementation of the present invention have been described above, the details of the configurations in the disclosed contents may be changed, and changes in combination, order of elements, and the like in the embodiments and modes of implementation can be implemented without departing from the scope and spirit of the present invention.

INDUSTRIAL APPLICABILITY

As described above, it is possible to realize a bar feeder capable of increasing usage efficiency of space in the surrounding area of a machine tool and achieving multifunctionality in a limited space.

REFERENCE SIGNS LIST

100: machine tool, 130: tool main shaft, 140: first main shaft, 150: second main shaft, 160: second tool rest (turret), 180: cover body, 200: operation panel, 210: NC program storage unit, 220: NC device, 230: machine tool servo control unit, 240: robot control unit, 250: robot servo control unit, 260: feeder control device, 270: feeder servo control unit, 300: work room, 330: articulated robot, 340: workpiece placement table, 350:

shutter, 400: bar feeder, 410: workpiece stocker, 420: workpiece support, 430: workpiece feeder, 440: workpiece pushing mechanism, T, T': tool, Ws: chip-shaped workpiece, Wr: rod-shaped workpiece

The invention claimed is:

1. A machine tool comprising:

a processing room where a hollow main shaft for holding a workpiece using a holding mechanism provided at one end of the hollow main shaft is installed;

a first cover body that covers the processing room and has a door in front surface of the first cover;

a work room arranged adjacent to the processing room;

a second cover body that covers the work room and arranged to the right side of the first cover body;

a bar feeder that is arranged inside of the second cover so as to be arranged to the right side of the hollow main shaft and configured to push a rod-shaped workpiece into the hollow main shaft from another end; and a work mechanism that is arranged inside of at least the second cover body, wherein the work mechanism includes a transport mechanism that is arranged inside of at least the second cover and configured to move an article between the processing room and the work room;

wherein the bar feeder is arranged at a position at which at least a portion thereof overlaps with the work mechanism in a top view or a front view.

2. The machine tool according to claim 1, wherein a shutter for allowing communication and shutting off communication between the processing room and the work room is provided on a pushing path of the rod-shaped workpiece pushed by the bar feeder.

3. The machine tool according to claim 1, wherein a shutter for allowing communication and shutting off communication between the processing room and the work room is provided between the first cover body and the second cover body.

4. The machine tool according to claim 1, wherein the bar feeder comprises:

a workpiece stocker capable of accommodating a plurality of the rod-shaped workpieces;

a workpiece support configured to support the rod-shaped workpiece so as to be movable toward the main shaft;

a work feeder configured to retrieve the rod-shaped workpiece from the workpiece stocker and guide the retrieved rod-shaped workpiece to the workpiece support; and a workpiece pushing mechanism configured to push the rod-shaped workpiece supported by the workpiece support into the main shaft.

5. The machine tool according to claim 1, wherein the processing room is a processing room of a multitasking machine including a first main shaft for holding a workpiece, a second main shaft arranged so as to oppose the first main shaft, and a tool main shaft for processing the workpiece, and the rod-shaped workpiece is pushed into the second main shaft.

6. A machine tool comprising:

a processing room where a hollow main shaft for holding a workpiece using a holding mechanism provided at one end of the hollow main shaft is installed;

a first cover body that covers the processing room and has a door in front surface of the first cover;

a work room arranged adjacent to the processing room;

a second cover body that covers the work room and arranged to the right side of the first cover body; and a bar feeder that is arranged inside of the second cover so as to be arranged to the right side of the hollow main shaft and configured to push a rod-shaped workpiece into the hollow main shaft from another end;

wherein the hollow main shaft is configured to move a left-right direction in the processing room.

* * * * *